(12) United States Patent
Alder

(10) Patent No.: US 6,309,756 B1
(45) Date of Patent: Oct. 30, 2001

(54) POLYMERIC FILMS

(75) Inventor: Paul Thomas Alder, Swindon (GB)

(73) Assignee: Hoechst Trespaphan GmbH, Neunkirchen (DE)

( * ) Notice: Subject to any disclaimer, the term of this patent is extended or adjusted under 35 U.S.C. 154(b) by 0 days.

(21) Appl. No.: 09/581,630
(22) PCT Filed: Dec. 16, 1998
(86) PCT No.: PCT/EP98/08243
  § 371 Date: Jun. 15, 2000
  § 102(e) Date: Jun. 15, 2000
(87) PCT Pub. No.: WO99/32287
  PCT Pub. Date: Jul. 1, 1999

(30) Foreign Application Priority Data

Dec. 19, 1997 (GB) .................................... 9726837

(51) Int. Cl.$^7$ ...................................... B32B 27/08
(52) U.S. Cl. .................. 428/476.9; 525/92 A; 428/319.9
(58) Field of Search ................. 428/476.9, 576, 428/319.9; 525/92 A, 167

(56) References Cited

U.S. PATENT DOCUMENTS 5,482,780  1/1996  Wilkie et al. .
6,045,919  *  4/2000  Alex et al. ........................ 428/476.9

FOREIGN PATENT DOCUMENTS 4432777    9/1994  (DE) .
WO91/17211 11/1991 (WO) .

* cited by examiner

Primary Examiner—James J. Seidleck
Assistant Examiner—Melanie D. Bagwell
(74) Attorney, Agent, or Firm—Powell, Goldstein, Frazer & Murphy LLP

(57) ABSTRACT

Polypropylene films having a base layer of a propylene polymer with at least one matte outer layer of a blend of a polyether block polyamide, polypropylene, and polybutene-1, the polybutene-1 representing from 40 to 60 wt. % of the blend. Such films have shown good antistatic properties combined with particularly low heat seal thresholds compared with similar films without the polybutene-1 in the outer layer or layers.

13 Claims, No Drawings

POLYMERIC FILMS

This invention concerns polymeric films, and in particular polypropylene films having a low heat seal threshold combined with good antistatic properties.

There have been many proposals for heat sealable polypropylene films consisting of a base layer of a propylene homopolymer and an outer layer of a polyolefin which facilitates heat sealing of the film to itself or to another polymeric material. There have also been many proposals for modifying the properties of such films by the inclusion of various additives in their outer layers or within one or more layers within such films. Examples of such additives include antiblock agents such as silica, slip agents such as fatty acid amides, and antistatic agents such as bis-ethoxylated amines. There is a continuing demand for polypropylene films having improved properties. However, there are often disadvantages which accompany the provision of an advantage in such films. Thus an improvement in the antistatic properties of a film resulting from the use of a particular additive can result in reduced optical properties such as film gloss and/or transparency.

DE4432777 proposes the use of blends of 20 to 50wt % of hydrophobic polyether block amides with polyolefins as providing such films with permanent antistatic and/or condensation reducing properties. However, the heat seal thresholds of films which use the blends disclosed in this prior art document as heat seal layers have been found to be high with low ultimate seal strengths, and the use of these blends runs counter to the desire to provide heat sealable films with low heat seal thresholds.

According to the present invention there is provided a polypropylene film comprising a base layer of a propylene polymer having an outer layer comprising a blend of a polyether block polyamide, polypropylene and polybutene-1, wherein the polybutene-1 represents from 40 to 60 wt % of the blend.

Films in accordance with the present invention not only have shown good antistatic properties, but they have also shown particularly low heat seal thresholds when compared with films having outer layers formed from the polyether block polyamide and polypropylene alone. Films in accordance with the present invention have also shown desirable matt surface properties. The polybutene-1 content of the blend is preferably about 50% by weight.

Although the said outer layer of films of the present invention can consist of specified blend alone, it is generally preferred that they also contain other additives used in polypropylene films, for example an antiblock agent, for example silica, a silicate or a polymeric antiblock agent, e.g. a polyacrylate or a polyamide, and/or a slip agent, for example a fatty acid amide, e.g. erucamide or oleamide.

The base layer of films of the present invention is preferably of a propylene homopolymer, and they can be voided or non-voided. When voided, voiding can be induced using organic or inorganic voiding agents, for example polyamides, polyesters, e.g. polymethyl methacrylate, polyethylene terephthalate or polybutylene terephthalate, or chalk. If desired, the base layers of films of the present invention may contain a pigment which does not induce voiding in addition to or alternatively to the presence of a voiding agent, for example titanium dioxide.

The base layer of films of the present invention may, if desired, contain one or more additives which affect the physical properties of the films, for example migratory slip and/or antistatic agents.

In addition to the base layer and an outer layer of the blend of a polyether block amide with polypropylene and polybutene-1, films of the present invention can include a further outer layer of a blend of a polyether block amide with polypropylene and polybutene-1, the composition of the further layer being the same as or different from that of the other outer layer. However, other heat sealable materials can be used to form further heat sealable layers, for example olefin copolymers and terpolymers, and blends of two or more thereof. Examples of co-and terpolymers which can be used include polymers containing units derived from at least two of ethylene, propylene, butene-1, and higher alpha-olefins.

Films of the present invention can also include one or more intermediate layers between the base layer and the outer layer of the blend of a polyether block amide with polypropylene and polybutene-1. Such layers are preferably formed from at least one polyolefin, and more particularly from propylene polymers, for example propylene homopolymers or propylene copolymers containing units derived from small amounts of one or more other alkene, for example ethylene or butene-1.

If desired, intermediate layers of films of the present invention can include a pigment and/or a voiding agent, for example as proposed for the base layer.

Either or both of the outer surfaces of films of the present invention can be treated to increase their respective surface energies, for example using corona discharge, flame or plasma treatment.

Films in accordance with the present invention can be of a variety of thicknesses. However, outer layer or layers of the blends of a polyether block amide with polypropylene and polybutene-1 will usually have thicknesses of from 0.5 to 2 μm, a preferred range being from 0.7 to 1.5 μm.

The base layer will usually form the majority of the thickness of films of the present invention even when one or more intermediate layers are present, the thicknesses of such intermediate layers usually being substantially that required to provide a particular effect, for example increased gloss to an outer layer thereon or increased opacity when the base layer is voided. Films in accordance with the present invention can, for example, be as thin as 20 μm or less, for example for packaging applications, and they can be 50 μm or more thick, for example for labels.

Films in accordance with the present invention can be prepared by known methods, for example by coextrusion of layers of melts of the base layer, the blend of the polyether block amide with polypropylene and polybutene-1, and any other layers which are to be present in the final films. The films can be merely cast, but they are preferably oriented in at least one direction, biaxial orientation being particularly preferred. When films in accordance with the present invention are biaxially oriented, this can be effected simultaneously, for example in the so-called bubble process, or sequentially, for example using heated rollers in one direction followed by a stenter oven to effect stretching in the transverse direction. Sequential stretching will usually be used when it is desired to produce films which include at least one layer which is voided.

The following Examples are given by way of illustration only.

EXAMPLE 1

A five layer polymer web was prepared by coextruding through a slot die a base layer of a propylene homopolymer containing particulate chalk (mean particle size 3.5 μm) as a voiding agent and sub-micronic titanium dioxide as a pigment with on one surface thereof a first intermediate layer of a blend of a propylene/ethylene copolymer and polyethylene, and a first outer layer of a blend of 50 wt % of Polystat 2300 (ex Schulman NV—a blend of a hydrophobic polyether block amide and polypropylene) with 50 wt % of polybutene-1, and on the other surface of the base layer a second intermediate layer of a propylene homopolymer containing sub-micronic titanium dioxide, and a second outer layer of a propylene/ethylene copolymer.

The five layer web was then sequentially stretched, first in the direction of extrusion by a factor of 5:1 using heated rollers with different peripheral speeds, and then in the transverse direction by a factor of 9:1 using a stenter oven.

The resulting biaxially stretched film was then cooled and wound up. It had an overall thickness of 80 $\mu$m, with the first intermediate layer being 3.0 $\mu$m thick, the first outer layer being 1.0 $\mu$m thick, the second intermediate layer being 8.0 $\mu$m thick, and the second outer layer being 1.0 $\mu$m thick.

The first outer layer of film had a matt surface with a resistivity of $2 \times 10^{12}$ ohms and a heat seal threshold of 78° C. The time to half discharge post doff was 18 seconds.

EXAMPLE 2 (comparison)

A substantially identical five layer film to that described in Example 1 was produced except that the first outer layer was a 1.0 $\mu$m thick layer of the Polystat 2300 used in Example 1.

The first outer layer of this film had a surface resistivity of approximately $2 \times 10^{13}$ ohms and its heat seal threshold was 128° C. Its time to half discharge post doff was 2 seconds.

EXAMPLE 3 (comparison)

A biaxially oriented multi-layer film was produced in a similar manner to that used for the five layer film of Example 1 except that the first outer layer was replaced by the blend used for the first intermediate layer.

This film had a heat seal threshold of approximately 133° C., and discharge post doff was in excess of 300 seconds.

What is claimed is:

1. A polypropylene film comprising a base layer of a propylene polymer having an outer layer comprising a blend of a polyether block polyamide, polypropylene and polybutene-1, wherein the polybutene-1 represents from 40 to 60 wt % of the blend.

2. A film according to claim 1, wherein the base layer comprises a propylene homopolymer.

3. A film according to claim 1, wherein the base layer is voided.

4. A film according to claim 1, wherein the base layer is substantially non-voided.

5. A film according to claim 1, wherein the base layer contains a migratory slip agent or an antistatic agent.

6. A film according to claim 1, having an intermediate layer between the outer layer and the base layer.

7. A film according to claim 1, having a further outer layer comprising a blend of a polyether block polyamide, polypropylene and polybutene-1, wherein the polybutene-1 represents from 40 to 60 wt % of the blend.

8. A film according to claim 7, wherein the outer layer and the further outer layer are of the same composition.

9. A film according to claim 7, having an intermediate layer between the further outer layer and the base layer.

10. A film according to claim 6, wherein the intermediate layer or layers is formed from at least one polyolefin.

11. A film according to claim 6, wherein the intermediate layer or layers are pigmented.

12. A film according to claim 6, wherein the intermediate layer or layers is voided.

13. A film according to claim 1, wherein at least one surface of the film has been treated to increase its surface energy.

* * * * *